Figure 14:
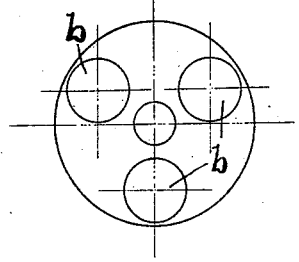

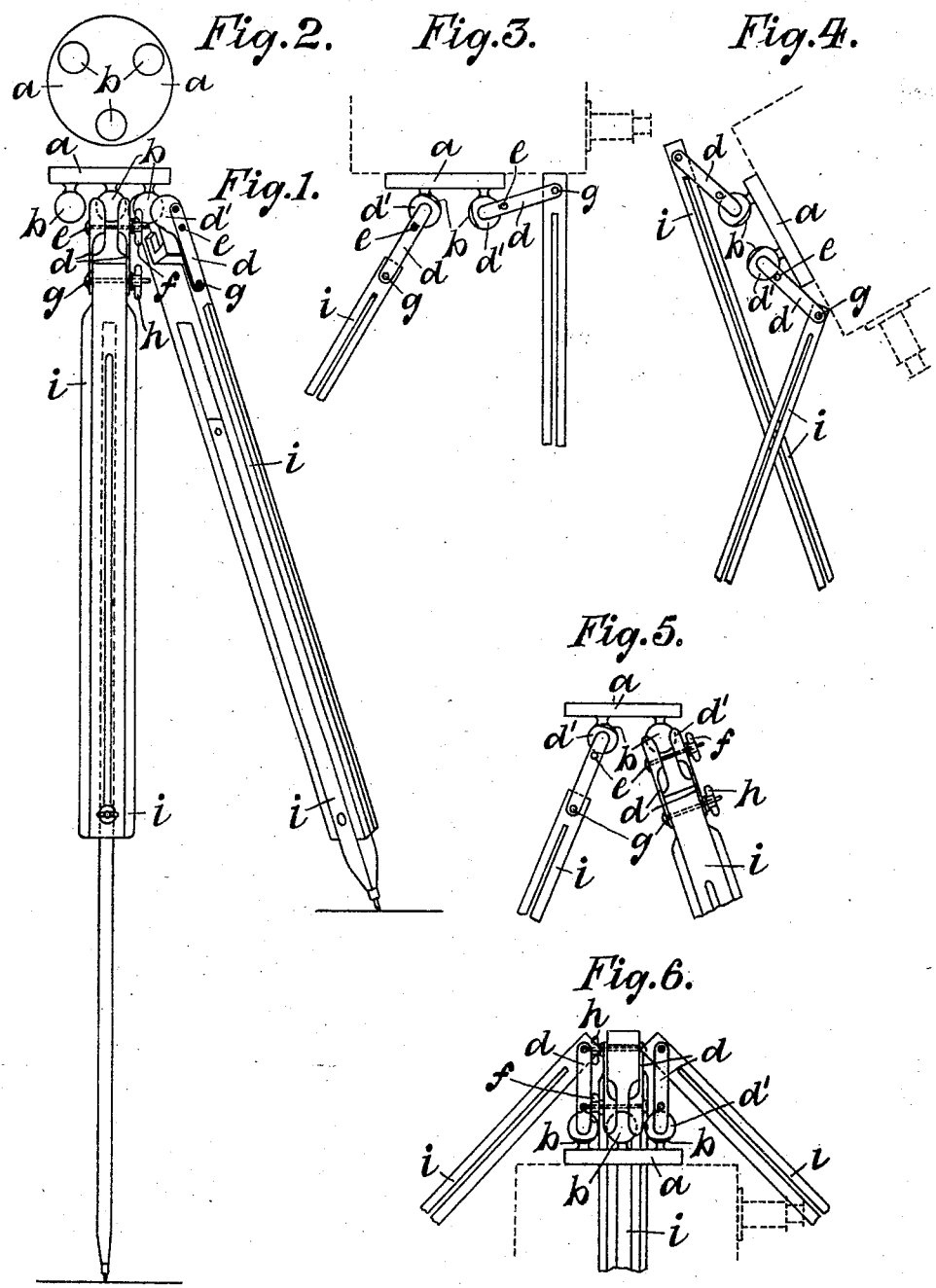

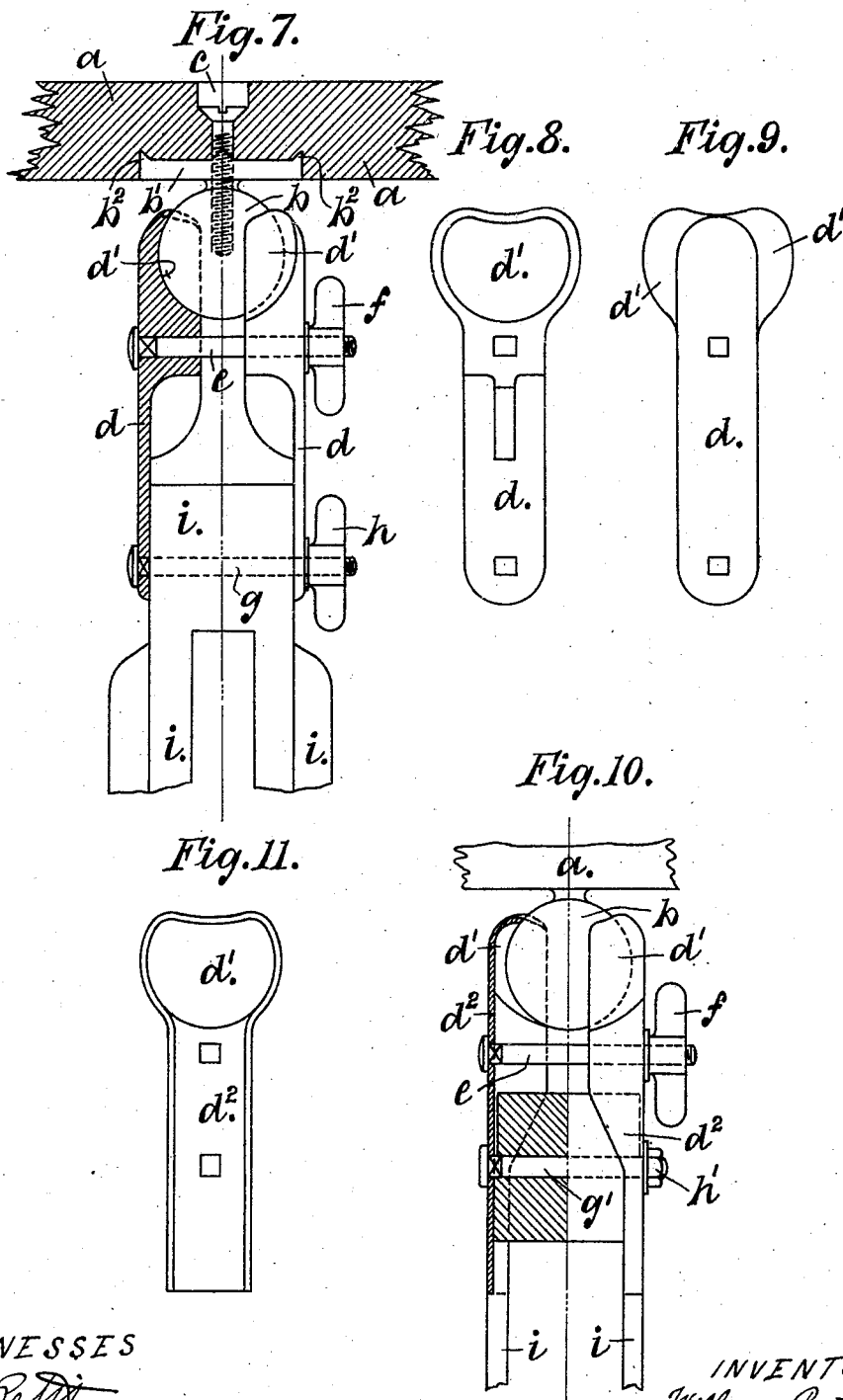

No. 880,192. PATENTED FEB. 25, 1908.
W. BUTLER.
STAND FOR PHOTOGRAPHIC CAMERAS, TELESCOPES, AND OTHER SCIENTIFIC INSTRUMENTS.
APPLICATION FILED OCT. 6, 1906.

3 SHEETS—SHEET 3.

WITNESSES
W. P. Burke

INVENTOR
William Butler
By Richard
ATTYS.

THE NORRIS PETERS CO., WASHINGTON, D. C.

UNITED STATES PATENT OFFICE.

WILLIAM BUTLER, OF BIRKDALE, SOUTHPORT, ENGLAND.

STAND FOR PHOTOGRAPHIC CAMERAS, TELESCOPES, AND OTHER SCIENTIFIC INSTRUMENTS.

No. 880,192.  Specification of Letters Patent.  Patented Feb. 25, 1908.

Application filed October 6, 1906. Serial No. 337,701.

*To all whom it may concern:*

Be it known that I, WILLIAM BUTLER, a subject of the King of England, and a resident of 20 Crosby road, Birkdale, Southport, in the county Palatine of Lancaster, England, have invented certain new and useful Stands for Photographic Cameras, Telescopes, and other Scientific Instruments, of which the following is a specification.
This invention relates to improvements in tripods or other like stands, primarily for photographic cameras, but which may also be employed in combination with telescopes, and like scientific instruments.
The objects of my said invention are to increase the mobility or adaptability of the stand, to simplify its construction, and to render it more easily and quickly adjusted, so enabling the tripod legs to be placed in such positions that the camera or instrument can be fixed in any conceivable angle, or in such a position that the lens is either at the desired angle, or directly over the object of which a picture is desired to be taken, and the legs capable of being placed so as not to intervene between the lens and the object, if the camera or instrument is required in the last named position. Or to enable one of the legs of the tripod to be placed vertically and the others crossed if the required position of the camera or instrument necessitates the tripod being placed at the edge of a precipice or other similar situation. Furthermore, this invention enables the tripod head with a camera attached to be completely inverted, thus enabling objects to be photographed within a few inches of the ground.

According to my present invention, and in one construction, I provide projections of ball, disk, or other suitable shape (securely held by suitable means), on the underside of the tripod head. I place between said projections under the head, and the legs of the stand, links constructed with recesses at their upper ends so as to enable them to tightly clasp said projections. I secure the bottom ends of the links to the legs of the stand by bolts passing through said links and upper ends of the legs of the stand and nuts and I tighten the links so that the recesses in the upper ends of the links clasp the projections on the underside of the tripod head, by means of a bolt or bolts passing through the said links, and provided with wing or other nuts.

When desired, I dispense with the links referred to above, and connect the projections on underside of head directly to the upper ends of the legs of the stand, which are forked or otherwise suitably formed at the upper ends, and provided with recesses to receive and clasp said projections in a similar manner to that described in connection with the links referred to above; a bolt or bolts having wing or other nuts being employed to effect the tightening or loosening of the legs so permitting them to move freely upon the projections, and independently of each other. Or, again, to secure the same object, *i. e.* to obtain a firm grip between the surfaces of the projections on the underside of the head, and of the surfaces of the recesses formed in the links or upper ends of the legs, either or both surfaces may be left rough to an adequate degree, so as to prevent the surfaces in contact from slipping when acute or other angles of the tripod head are assumed, the desired position of the head being secured by means of the bolts passing, as described, through the links or legs, and fastened by wing or other nuts referred to.

Drawings illustrating my invention are annexed hereto, in which:—

Figure 12:
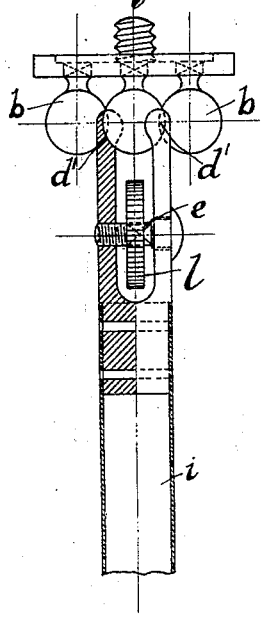
Figure 13:
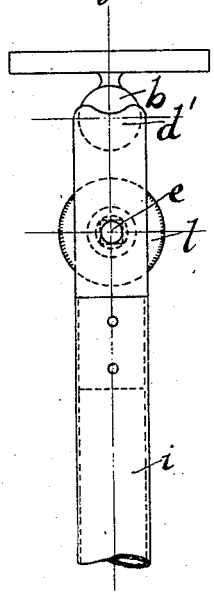
Figure 15:
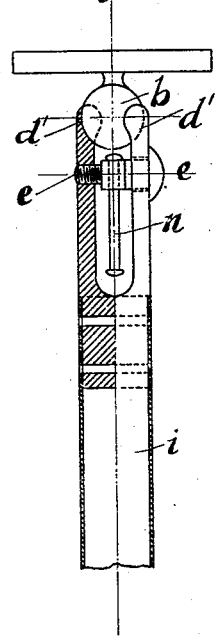

Figure 1 represents a tripod head and two legs provided with my improvements, placed in an ordinary position; and Fig. 2 is a plan of the underside of the head, showing the fixed projections referred to. Figs. 3 and 4 are side elevations, illustrating the tripod head in varied positions as examples, and in which views it will be understood that the third leg of the stand is obscured from view. Fig. 5 illustrates, for example, legs disposed in planes at right angles to each other. Fig. 6 shows the tripod head completely inverted. Fig. 7 is an elevation, partly in section, drawn to an enlarged scale, illustrating one mode of connecting the fixed projections on the tripod head, with their legs, through links placed between said projections and legs. Figs. 8 and 9 are, respectively, front and back views of the links employed in Fig. 7. Fig. 10 is an elevation, partly in section, showing, as example, one mode of connecting the fixed projections on the tripod head directly with the legs, i. e. without the use of links as employed in Fig. 7; Fig. 11 being a front view of the attachments rigidly secured to or forming part of the legs (for the purpose of receiving and clasping said projections,) as shown in Fig. 10. Fig. 12 is an elevation partly in section, illustrating a modified mode of tightening the legs on the projections. Fig. 13 is an elevation at right angles to Fig. 12; and Fig. 14 is a plan. Fig. 15 illustrates an alternative device for operating the tightening screw, as shown in Figs. 12 & 13.

In the several figures, like letters of reference denote like or equivalent parts wherever they occur.

Referring now to the drawings, but more particularly to Figs. 1 to 9, $b$ represent ball shaped projections, firmly secured to the tripod head $a$, at preferably equal distances apart, by means of screws $c$ (shown in enlarged drawing Fig. 7) and spikes $b^2$, formed on the plates $b'$ in one with $b$, and which spikes are embedded in the head $a$, as shown, so preventing the projections $b$ from turning; other suitable means of firmly securing the projections $b$ to head $a$, such as riveting may however be employed, if desired.

$d$ are links provided with recessed parts $d'$ at their upper ends. $e$ are bolts passing through said links, and $f$ are wing nuts, by means of which the projections $b$ may be tightly clasped and held by said links in any desired position, or loosened, as required.

$g$ and $h$ are, respectively, bolts and nuts by which the bottom ends of links $d$ are secured to legs $i$.

In the modification shown in Figs. 10 and 11, the links $d$ are dispensed with, the projections $b$ being connected directly to the upper ends of the legs $i$ through rigid fittings $d^2$, (shown as examples, but which may vary in form), which may be attached to the legs $i$ by bolts $g'$ and nuts $h'$ or other equivalent means.

Referring now to Figs. 12 to 14, the leg $i$ is tubular say, of aluminium or brass, the bifurcated extremities of which are provided with recesses $d'$ which receive and clasp the projection $b$. The tightening or loosening of the leg on projection $b$ is effected by a milled wheel $l$ fitted on to the squared part of the bolt $e$, which is screwed at one end into one of the limbs of legs $i$, as shown.

In the modification illustrated in Fig. 15 the controlling bolt $e$ is nearer the recesses $d'$ and is actuated by the lever $m$.

A stand constructed as above described and in which the tubular legs $i$ are of the telescopic type is particularly suitable for light hand cameras.

While the projections $b$ have been described and illustrated as being conveniently located on the underside of the tripod head, in exceptional cases they may be placed on the edge of same, or at varying angles to the head, or said projections may if required be attached to, or form part of the camera or other instrument, dispensing with the head $a$.

Having now described my invention, what I claim as new, and desire to secure by Letters Patent is:—

1. In a stand for the purposes specified, a head; projections securely connected with said head; links provided with recesses adapted to receive and clasp said projections; legs connected to said links; and means whereby said links and said legs may be held in required positions.

2. In a stand for the purpose specified, a head; projections securely connected with said head, legs provided with recesses adapted to receive and clasp said projections and means whereby said legs may be rotated in any direction about said projections and means for holding said legs in required positions.

3. In a stand for the purposes specified; a head; ball shaped projections securely connected with said head; links provided with recesses adapted to receive and clasp said projections; legs connected to said links; and means whereby said links and said legs may be held in required positions.

4. In a stand for the purposes specified; a head; ball shaped projections securely connected with said head; links provided with recesses adapted to receive and clasp said projections; legs connected to said links by bolts adapted to pass through the lower parts of said links, and the upper parts of said legs, and wing nuts; and tightening bolts and nuts adapted to secure the links to said projections.

5. In a stand for the purposes specified; a head; ball shaped projections securely held to said head; recessed pieces secured to the upper parts of said legs, by means of bolts and nuts; and bolts and wing nuts adapted to hold said legs in required positions.

In testimony whereof I have signed my name to this specification in the presence of two subscribing witnesses.

WILLIAM BUTLER.

Witnesses:
JOHN H. WALKER,
H. WATSON.